United States Patent [19]

Nagamatsu

[11] Patent Number: 5,226,003
[45] Date of Patent: Jul. 6, 1993

[54] MULTI-PATH MULTIPLIER
[75] Inventor: Masato Nagamatsu, Kawasaki, Japan
[73] Assignee: Kabushiki Kaisha Toshiba, Kawasaki, Japan
[21] Appl. No.: 724,820
[22] Filed: Jul. 2, 1991

[30] Foreign Application Priority Data

Jul. 17, 1990 [JP] Japan .................................. 2-187259

[51] Int. Cl.⁵ .............................................. G06F 7/52
[52] U.S. Cl. ...................................................... 364/760
[58] Field of Search .......................................... 364/760

[56] References Cited

U.S. PATENT DOCUMENTS

| | | | |
|---|---|---|---|
| 4,597,053 | 6/1986 | Chamberlin | 364/760 |
| 4,706,211 | 11/1987 | Yamazaki et al. | 364/760 |
| 4,745,570 | 5/1988 | Diedrich et al. | 364/760 |
| 4,769,780 | 9/1988 | Chang | 364/760 |

OTHER PUBLICATIONS

Masato Nagamatsu et al., A 15 NS 32×32-Bit CMOS Multiplier with an Improved Parallel Structure, "*Proceedings of the IEEE 1989 Custom Integrated Circuits Conference*", pp. 10.3.1–10.3.4.

*Primary Examiner*—Long T. Nguyen
*Attorney, Agent, or Firm*—Foley & Lardner

[57] ABSTRACT

A low-cost high-speed multiplier comprises a first register for holding a multiplier; a second register for holding a multiplicand; a partial product generator for scanning the multiplier held in the first register to generate three partial products of the multiplicand held in the second register; a 4-input adder for finding the sum of the three partial products and a fourth number; a shift register for holding and shifting the sum; and a unit for returning the shifted sum except a shifted-out portion of the sum to an input of the 4-input adder. This arrangement can process three partial products in one time of addition.

4 Claims, 4 Drawing Sheets

MULTI-PATH MULTIPLIER

BACKGROUND OF THE INVENTION

1. Field of the Invention

The present invention relates to a multiplier, and particularly to a high-speed multi-path serial-parallel multiplier.

2. Description of the Prior Art

Multipliers are classified into parallel multipliers and serial-parallel multipliers. The parallel multipliers are employed for signal processing VLSIs. The parallel multipliers add all partial products to one another at once, thereby realizing a very high processing speed. They, however, require a large amount of hardware so that they are not suitable for general-purpose signal processors.

On the other hand, the serial-parallel multipliers require a small amount of hardware so that they are suitable for general use. The serial-parallel multipliers, however, must repeat the addition arithmetic several times in conducting multiplication, thereby consuming a long processing time.

FIG. 1 shows an example of such serial-parallel multiplier. A register 101 holds a multiplier Y. A controller 103 scans the multiplier Y from its lower bits and controls a selector 105 in response to each of the scanned bits that may be 0 or 1. The selector 105 provides an adder 109 with a partial product, i.e., a multiplicand X stored in a register 107 or string of 0s. The adder 109 adds the partial product to an intermediate result calculated so far. A shifter 111 shifts the addition result one bit to the right. A register 113 holds the shifted result as an intermediate result, which is transferred again to the adder 109. After a partial product for a most significant bit of the multiplier Y is added, the adder 109 provides a final result of multiplication. This technique requires 32 cycles for calculating a multiplication of 32 bits.

One effective technique for reducing the number of additions to be done in the serial-parallel multiplier is to employ a Booth algorithm. This technique manipulates a plurality of bits of a multiplier to reduce the number of partial products to be processed.

FIG. 2 shows a multiplier employing a quadratic Booth algorithm. The quadratic Booth algorithm conducts multiplication according to the following equations:

$$X = -x_{N-1} \cdot 2^{N-1} + \sum_{K=1}^{N-2} x \cdot 2^K$$

$$Y = -y_{N-1} \cdot 2^{N-1} + \sum_{K=1}^{N-2} y \cdot 2^K$$

$$= \sum_{n=0}^{K=1} (y_{2n-1} + y_{2n} - 2y_{2n+1})2^n$$

$$X \cdot Y = \sum_{n=0}^{N/2-1} (y_{2n-1} + y_{2n} - 2y_{2n+1})2^n \cdot X \quad (1)$$

It is supposed $y_{-1}=0$. As is apparent from the equation (1), each three bits of a multiplier Y are collectively evaluated to halve the number of partial products. According to a value calculated between the parentheses of the equation (1), a decoder 115 provides a processing circuit 123 with a shifting signal 117 (multiplying by 2), an inverting signal 119 (multiplying by $-1$), or a switching signal 121 (generating a string of 0s). A shifter 125 shifts an output of an adder 109 by two bits. This technique may halve the number of additions but must still repeat an addition process 16 times in multiplying a number of 32 bits.

In this way, the conventional serial-parallel multipliers involve many addition processes and require a long processing time.

SUMMARY OF THE INVENTION

To solve the problems, an object of the invention is to provide a simple multiplier that can conduct multiplication with a small number of addition processes.

Another object of the above invention is to provide a low-cost high-speed multiplier.

In order to accomplish the objects, a multiplier according to the invention comprises a first register for holding a multiplier, a second register for holding a multiplicand, a partial product generator for scanning the multiplicand held in the first register and generating three partial products of the multiplicand held in the second register, a 4-input adder for calculating the sum of the three partial products and a fourth number, a shift register for holding and shifting the sum, and a unit for returning the shifted sum except a shifted-out portion thereof as the fourth number to an input of the 4-input adder. This arrangement can reduce the number of additions to one third of that of the conventional multiplier.

DETAILED DESCRIPTION OF THE EMBODIMENTS

Figure 1:
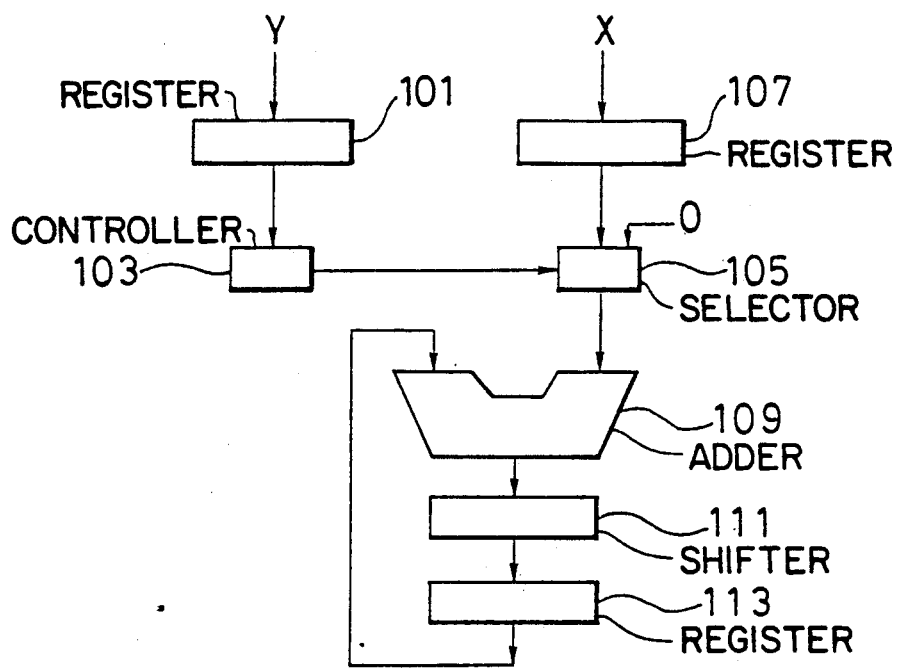
FIGS. 1 and 2 are block diagrams showing multipliers according to prior arts.
Figure 2:
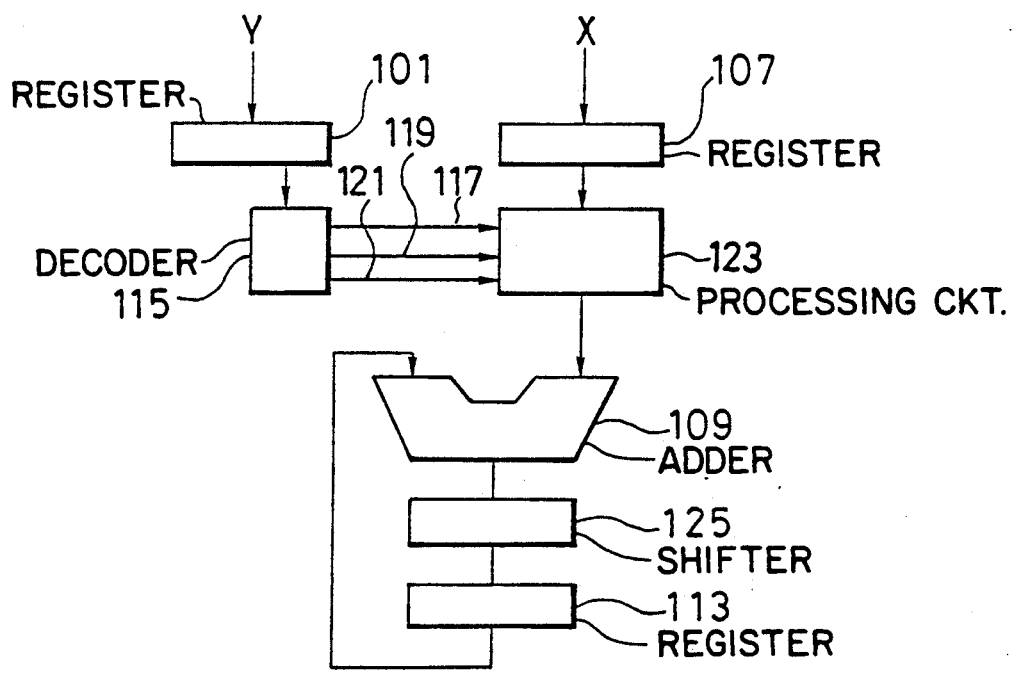
Figure 3:
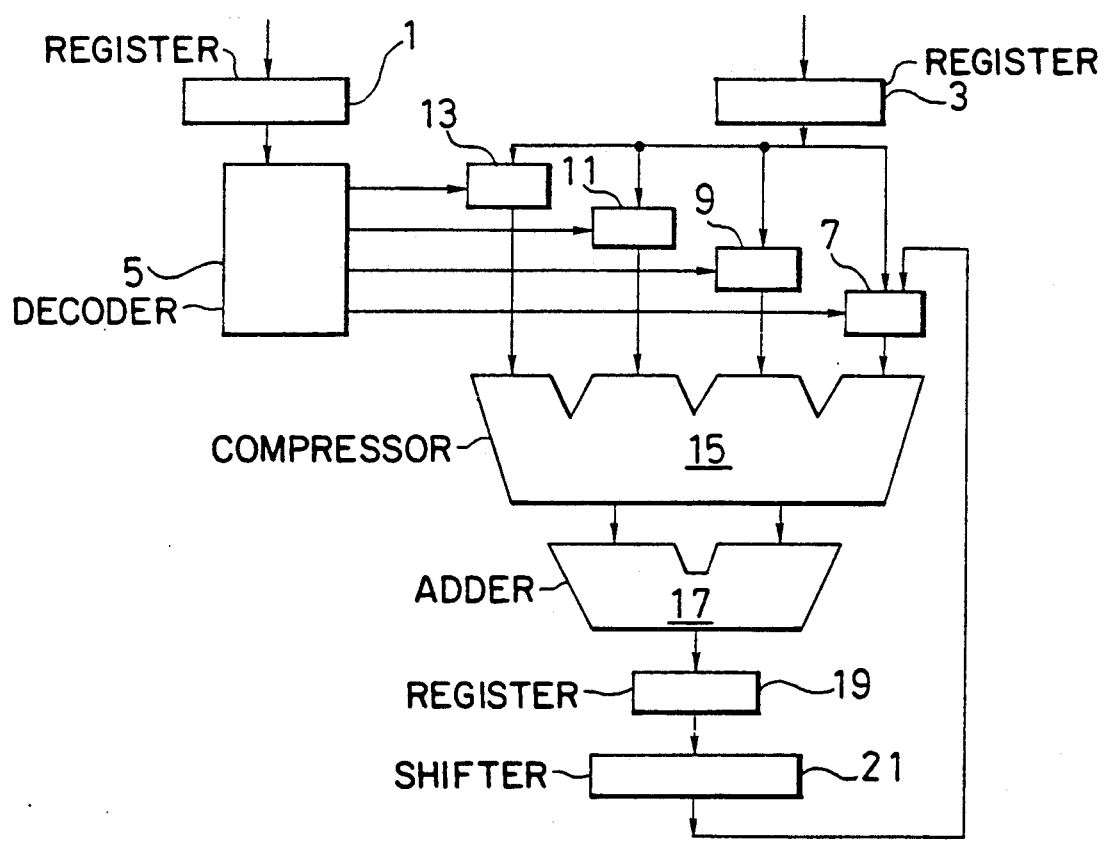
FIG. 3 is a block diagram showing a multiplier according to an embodiment of the invention.

FIG. 3 shows a high-speed multiplier according to an embodiment of the invention. This multiplier is based on the quadratic Booth algorithm of the equation (1). The multiplier comprises a register 1 for holding a multiplier; a register 3 for holding a multiplicand; a decoder 5 for scanning a string of bits of the multiplier and outputting control signals corresponding to values calculated inside the parentheses of the equation (1); selectors 7, 9, 11 and 13 for multiplying the multiplicand by 2, $-2$, 1, $-1$, or 0 according to the control signals provided by the decoder 5; a 4-input adder comprising a 4-2 compressor 15 and a full adder 17; a register 19, and a shifter 21.

At first, the decoder 5 decodes values calculated between the parentheses of the equation (1) with n=0, 1, 2 and 3, and provides the selectors 7, 9, 11 and 13 with control signals. Thereafter, the decoder 5 decodes values calculated inside the parentheses of the equation (1) with each three of "n," i.e., n=4, 5 and 6, n=7, 8 and 9, and so on, and provides the selectors 9, 11 and 13 with control signals. At this time, the selector 7 provides the compressor 15 with an intermediate result provided by the shifter 21.

The register 1 is a shift register of 33 bits involving $-1$st to 31st bit positions. The $-1$st bit position receives an initial value of 0, and the 0th to 31st bit positions receive the multiplier. The decoder 5 decodes the −1st to 1st bits, 1st to 3rd bits, 3rd to 5th bits and 5th to 7th bits of the register 1, and provides the selectors 7, 9, 11 and 13 with control signals. The register 1 shifts the contents thereof three bits to the right every cycle.

Figure 4:
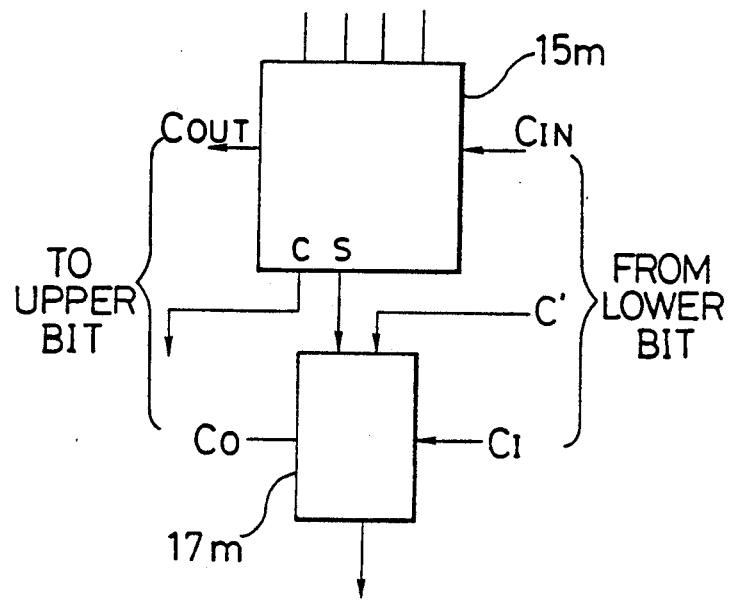
FIGS. 4 and 5 are a block diagram and a circuit diagram showing a 4-2 compressor for constituting a 4-input adder of the multiplier of the invention.
Figure 5:
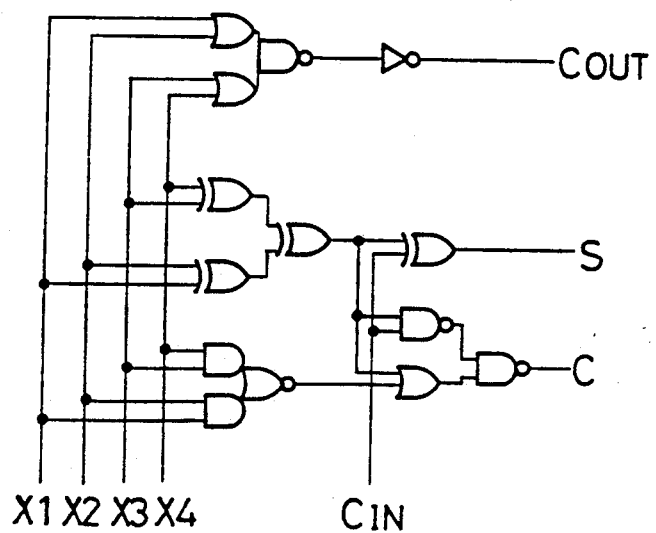

FIG. 4 shows a one-bit portion of the 4-2 compressor 15 and full adder 17 that constitute the 4-input adder. A 4-2 compressor 15 m receives four input bits to be added and a carry Cin from a lower bit position, and provides a full after 17 m located at a corresponding bit position with an output signal S, a full adder located at one higher bit position with an output carry C, and a 4-2 compressor located at one higher bit position with a carry Cout. A least significant bit carry and an output carry are fixed at 0 each. Namely, the 4-2 compressor has four inputs and two outputs, while the full adder has two inputs and one output. FIG. 5 is a circuit diagram showing the 4-2 compressor 15 m.

An operation of the multiplier according to the embodiment will be explained for a multiplication of 32-bit numbers. There will be 16 partial products corresponding to n=0 to 15 of the equation (1).

In a first cycle, the decoder 5 scans the multiplier held in the register 1, calculates values inside the parentheses of the equation (1) with n=0, 1, 2 and 3, and provides the selectors 7, 9, 11 and 13 with control signals. Each of the selectors 7, 9, 11 and 13 multiplies the multiplicand held in the register 3 by 2, −2, 1, −1 and 0, and provides the 4-2 compressor 15 with any one of the multiplication results in response to corresponding one of the control signals. This process is done by shifting or inverting the multiplicand or by generating a string of 0s. Output bit positions are 0 to 33 for n=0, 2 to 35 for n=1, 4 to 37 for n=2 and 6 to 39 for n=3.

The 4-2 compressor 15 and full adder 17 add the four inputs to one another, and the register 19 holds the addition result. The register 19 transfers the held data to 24th to 63rd bit positions of the shifter 21. The shifter 21 shifts the data six bits to the right, and transfers 25th to 57th bits of the shifted data to the selector 7. At this time, the shifter 21 shifts out lower six bits of the data as determined bits.

In a second cycle, the selectors 9, 11 and 13 provide the 4-2 compressor 15 with partial products for n=4, 5 and 6. The selector 7 provides the 4-2 compressor 15 with the 25th to 57th bits of the shifter 21. The 4-2 compressor 15 and full adder 17 add the outputs of the selectors 7 to 13 to one another. Register 19 holds a result of the addition, and transfers the same to the 26th to 63rd bits of the shifter 21. The shifter 21 shifts the transferred data bits of the right, and sends the 25th to 57th bits of the shifted data back to the selector 7. As a result, another lower six bits that have been shifted out are determined.

In the following third to fifth cycles, the same process as that of the second cycle is repeated for n=7, 8 and 9, n=10, 11 and 12, and n=13, 14 and 15. In the fifth cycle, the shifter 21 provides a final addition result.

Figure 6:
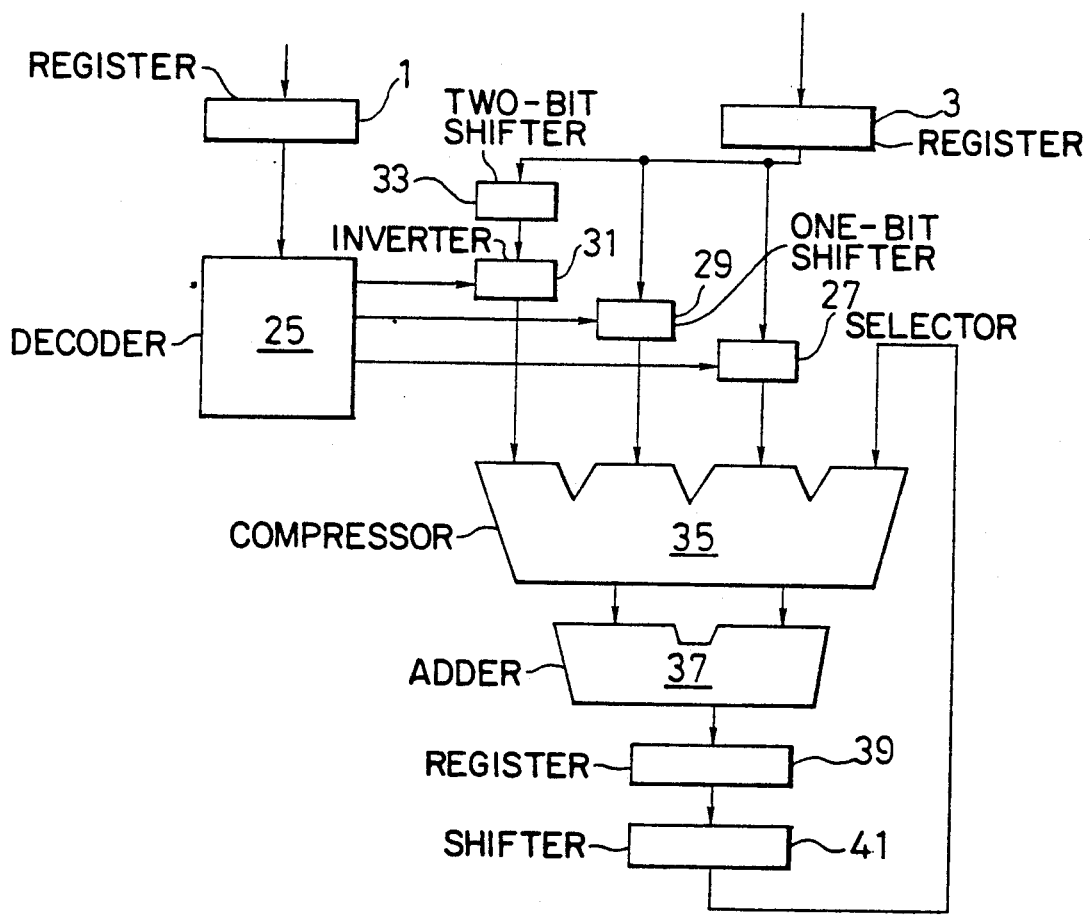
FIG. 6 is a block diagram showing a multiplier according to another embodiment of the invention.

FIG. 6 shows a high-speed multiplier according to another embodiment of the invention. This multiplier employs a cubic Booth algorithm that is based on the following equation:

$$X \cdot Y = \sum_{n=0}^{N/3-1} (-2^2 y_{n+2} + 2y_{n+1} + y_n + y_{n-1}) \cdot 2^{3n} \cdot X \quad (2)$$

A decoder 25 calculates values of the three terms $-2^2 y_{n+2}$, $2y_{n+1}$ and $y_n + y_{n-1}$ inside the parentheses of the equation (2) with each value of "n," and provides a selector 27, one-bit shifter 29 and an inverter 31 with control signals. An input of the inverter 31 is connected to a 2-bit shifter 33. The selector 27, one-bit shifter 29 and inverter 31 multiply a multiplicand stored in a register 3 by the values of the three terms, and provides a 4-2 compressor 35 with the multiplication results.

Similar to the previous embodiment, the 4-2 compressor 35 and a full adder 37 add the multiplication results to one another, and a register 39 holds the addition result. The register 39 has a capacity of 35 bits which is sufficient for holding the addition result.

The contents of the register 39 are transferred to 29th to 63rd bits of a shifter 41. The shifter 41 shifts the transferred data to the right by two bits when n is 0 and by three bits when n is any one of 1 through 10. After the shifting, the shifter 41 sends 29th to 63rd bits back to the 4-2 compressor 35. Upon receiving a partial product for n=10, the shift register 41 provides a result of the multiplication. In this embodiment, the selector 27, one-bit shifter 29, inverter 31 and 2-bit shifter 33 are not required to conduct addition arithmetic, so that the cubic Booth algorithm may be realized with a simple arrangement.

As mentioned above, the invention can remarkably reduce the number of repetitive calculations to realize a high-speed multiplier of simple arrangement.

Various modifications will become possible for those skilled in the art after receiving the teachings of the present disclosure without departing from the scope thereof.

What is claimed is:

1. A multi-path multiplier, comprising:
   a first register for holding a multiplier;
   a second register for holding a multiplicand;
   a partial product generator for scanning the multiplier held in the first register to generate three partial products of the multiplicand held in the second register and for generating the partial products according to a Booth algorithm, wherein the partial product generator comprises
   a decoder for decoding a string of bits of the multiplier according to the Booth algorithm,
   three selectors connected to the decoder for shifting and inverting the multiplicand and generating a string of zeros to provide signals,
   a fourth selector connected to the decoder for generating a partial product of the multiplicand as a fourth member when the partial product generator generates partial products for the first time in conducting multiplication, wherein the fourth member and the three partial products provided by the three selectors are transferred to a four-input adder and thereafter the fourth selector provides the four-input adder with a shifted sum provided by the first register, the four-input adder provided for finding a sum of the three partial products and the fourth member;
   a shift register for holding and shifting the sum; and
   means for returning the sum shifted by the shift register except a shifted-out portion of the sum to an input of the four-input adder.

2. The multi-path multiplier according to claim 1, wherein the Booth algorithm is quadratic, and each of the three partial products is obtained by multiplying the multiplicand by 2, −2, 1, −1 or 0 which depends on a string of bits of the multiplier.

3. The multi-path multiplier according to claim 1, wherein the Booth algorithm is cubic, and each of the three partial products is obtained by multiplying the multiplicand by −4, 2, 1, or 0 which depends on a string of bits of the multiplier.

4. The multi-path multiplier according to claim 1, wherein said 4-input adder comprises a 4-2 compressor and a full adder.

* * * * *